United States Patent
Sosna et al.

(10) Patent No.: US 11,544,241 B1
(45) Date of Patent: *Jan. 3, 2023

(54) SYSTEM AND METHOD FOR GENERATING AND MANAGING PSEUDO DATA FIELDS IN CRM

(71) Applicant: Veeva Systems Inc., Pleasanton, CA (US)

(72) Inventors: Arno Sosna, Pleasanton, CA (US); Povilas Petkevicius, Barcelona (ES); Camila Muse, Stoneham, MA (US)

(73) Assignee: Veeva Systems Inc., Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/246,514

(22) Filed: Apr. 30, 2021

Related U.S. Application Data

(63) Continuation-in-part of application No. 16/724,086, filed on Dec. 20, 2019, now Pat. No. 11,023,667.

(51) Int. Cl.
| | |
|---|---|
| *G06F 17/00* | (2019.01) |
| *G06F 3/0482* | (2013.01) |
| *G06F 3/0484* | (2022.01) |
| *G06F 16/21* | (2019.01) |
| *G06Q 30/00* | (2012.01) |
| *G06F 16/28* | (2019.01) |
| *G06F 21/62* | (2013.01) |

(52) U.S. Cl.
CPC ......... *G06F 16/212* (2019.01); *G06F 16/287* (2019.01); *G06F 21/6245* (2013.01); *G06Q 30/01* (2013.01)

(58) Field of Classification Search
CPC .. G06F 16/212; G06F 16/287; G06F 21/6245; G06Q 30/01
See application file for complete search history.

(56) References Cited

U.S. PATENT DOCUMENTS

| | | | |
|---|---|---|---|
| 2004/0073868 A1* | 4/2004 | Easter | G06F 40/174 715/225 |
| 2010/0094657 A1* | 4/2010 | Stern | G16H 40/63 715/845 |
| 2012/0310989 A1* | 12/2012 | Weissman | G06F 16/284 707/E17.044 |
| 2015/0135050 A1* | 5/2015 | No | G06F 16/21 715/222 |
| 2016/0328522 A1* | 11/2016 | Howley | G06Q 40/08 |
| 2018/0039648 A1* | 2/2018 | Han | G06F 16/219 |
| 2019/0004879 A1* | 1/2019 | Chang | G06F 9/543 |
| 2019/0238551 A1* | 8/2019 | Gassner | G06F 21/6218 |
| 2020/0104108 A1* | 4/2020 | Kempf | G06F 8/36 |
| 2020/0250661 A1* | 8/2020 | Padmanabhan | H04L 9/3263 |

* cited by examiner

*Primary Examiner* — Jordany Nunez

(57) ABSTRACT

Systems and methods for generating a pseudo data field in a CRM system to allow end users to generate and manage pseudo data fields for account objects in the CRM system, which may behave like actual data fields of account objects in the CRM system but live outside the CRM account. The present invention uses a data model that includes two objects to allow end users to generate and manage the pseudo data fields. One of the objects is pseudo data field configuration object, which may be used to configure the pseudo data fields that should be made available to end users. The other object is pseudo data field object which may be used to record user responses or values users use to populate the pseudo data field.

15 Claims, 16 Drawing Sheets

KOL Profile　　　　　　　　　　　　　　　　　　　　　Done

Alexander, Richard

Position: Senior Physician
Specialty: Thoracic Oncology

Institution: Wells Medical Center
Address: 200 48th Street, Suite 1600
Sacramento, CA 92115

Phone: 1+ 855-600-0000
Email: ralexander@udmc.com

Career History »

Wells Medical Center

Primary Position: Senior Physician
Institution: UC Davis Medical Center

- (8) Hospitals
- (2) Professorships
- (1) Department Head
- (3) Universities
- (5) Advisory Boards
- (4) Others

Affiliations »

23
Total Affiliations

- (8) Hospitals
- (2) Professionals
- (1) Practice
- (3) Institutions
- (5) Boards
- (4) Others

Expertise »

Stroke: ▮▮▮▮▮▯▯▯▯▯ 10

Company Collaboration »

My Company:

Neutral — Strong 14-1

Antonucci, Rose

- Back
- Edit
- Record a Call
- Launch Media
- New Medical Inquiry
- Send Email
- Consent Capture
- New Order
- Account Summary
- Custom Reports
- View Hierarchy
- Calendar
- Sphere of Influence
- Addresses (2)
- Customer Interactions (27)
- Call Samples (2)
- Multichannel Activities (0)
- Last Update: 7/17/2017, 10:33 AM

| Field | Value | Field | Value |
|---|---|---|---|
| Name | Rose Antonucci | Gender | F |
| Middle | A | Credentials | MD |
| Suffix | | Specialty | Cardiology |
| Preferred Name | Dr. A | Specialty 2 | General Practice |
| Status | | Primary Parent | Not Available |
| Order Type | All, Transfer | Language | English |
| Default Order Type | | Territory | View |
| My Account Info | | | |
| 1107 | | | |
| | | Route | |
| My Target | ☐ | Day Since Last Call | 14 |
| My Detailing Priority | | My Last Activity Date | 7/3/2017 |
| My Preferred Address | 400 Route 2A Suite E | My YTD Activity | 29 |
| My Preferred Location | | Allowed Product ⓘ | |
| Key Indicators | | | |
| Preferred Statin | Zostatin | Call Frequency | 24 |

SYSTEM AND METHOD FOR GENERATING AND MANAGING PSEUDO DATA FIELDS IN CRM

CROSS-REFERENCE TO RELATED APPLICATION

The present application is a continuation-in-part of U.S. nonprovisional patent application Ser. No. 16/724,086, filed on Dec. 20, 2019, entitled System and Method for Generating and Managing Pseudo Data Fields in CRM, which is hereby incorporated by reference herein for all purposes.

BACKGROUND

The subject technology relates generally to customer relationship management ("CRM"), and more particularly to generating and managing pseudo data fields in a customer relationship management system.

In the pharmaceutical sales industry, sales representatives visit, call or send emails to doctors to communicate product information. Their company employers (e.g., pharmaceutical companies) often use a CRM system to manage the doctors' professional information. In a conventional CRM system, end users, including business users and field users, are not authorized to create new data fields on account objects in the CRM system. If an end user needs to use a new data field, he/she has to submit a request to IT professionals, and wait for the IT professionals to create the new data field on CRM account objects. Sometimes this may take weeks, since the company employers may have many considerations for creating new data fields on CRM account objects, including custom field limit per object in the CRM system, and the duration of the field as some fields may only be needed for a short period of time.

SUMMARY

The disclosed subject matter relates to a method for generating a pseudo data field in a CRM system. The method comprises: receiving a request, at a pseudo data field controller in a server of the CRM system, for generating a pseudo data field for an account object in the CRM system; and displaying a first user interface for generating the pseudo data field, wherein the first user interface comprises a first area for receiving input for configuring a pseudo data field configuration object. The method further comprises: receiving a first user input, in the first area on the first user interface, for a pseudo data field configuration object; storing the pseudo data field configuration object in a storage device of the CRM system; and generating and displaying a combined CRM account detail page, wherein the combined CRM account detail page comprises a first area for displaying fields of the account object in the CRM system and a second area for displaying the pseudo data field. The method further comprises: receiving a second user input in the pseudo data field on the combined CRM account detail page; and storing the second user input in a pseudo data field object in the storage device of the CRM system, separately from data in the fields of the account object in the CRM system.

BRIEF DESCRIPTION OF THE DRAWINGS

FIG. 10 to FIG. 15 each illustrates an example custom report according to one embodiment of the present invention.

FIG. 16 illustrates an example of a traditional CRM account screen.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

The present invention provides a system and method to allow end users to generate and manage pseudo data fields for account objects in the CRM system, which may behave like actual data fields of account objects in the CRM system but live outside the CRM account, and do not need IT interventions. The present invention uses a data model that includes two objects to allow end users to generate and manage the pseudo data fields. The two objects do not count as actual CRM account metadata, and behavior specifics that need to apply to CRM accounts and CRM data fields do not apply to the two objects or the pseudo data fields. One of the objects is pseudo data field configuration object, which may be used to configure the pseudo data fields that should be made available to end users. The other object is pseudo data field object which may be used to record user responses or values users use to populate the pseudo data field.

Figure 1:
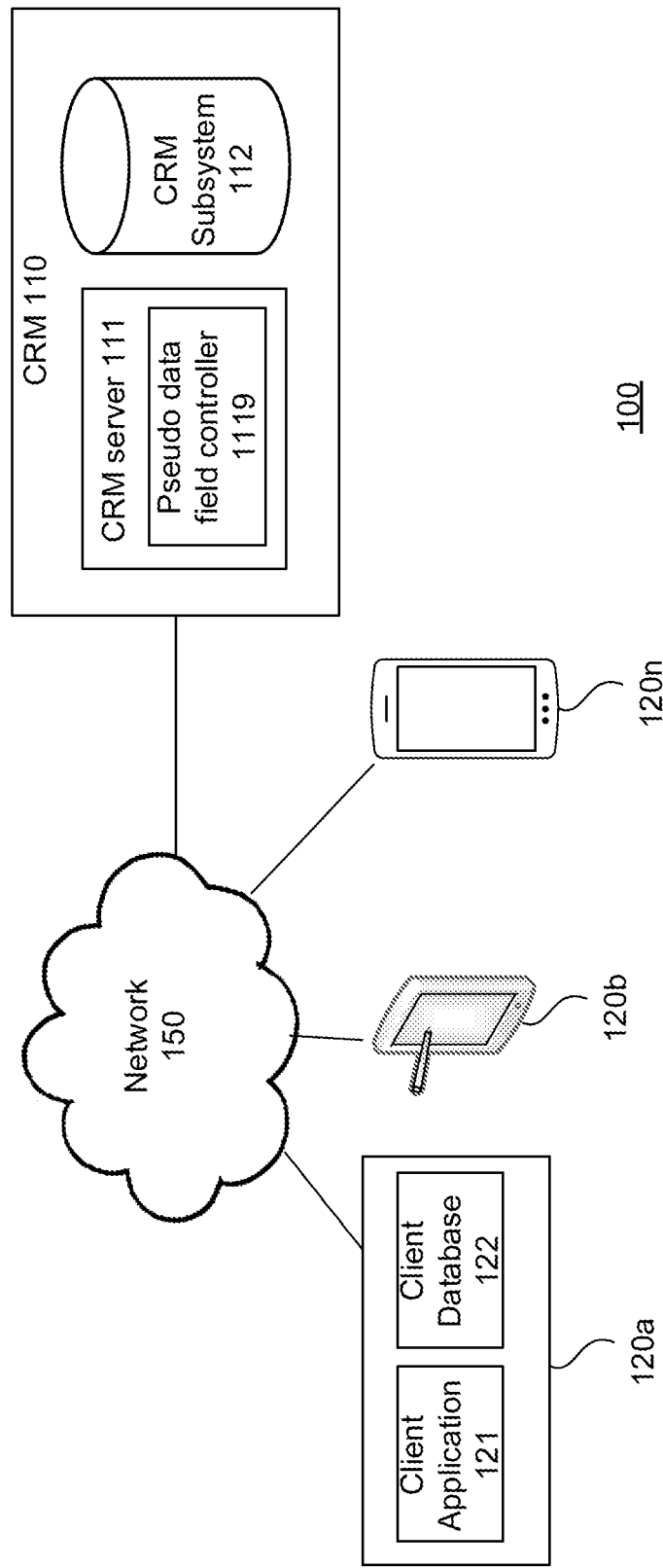
FIG. 1 illustrates an example high level block diagram of a customer relationship management architecture wherein the present invention may be implemented.

FIG. 1 illustrates an example high level block diagram of a customer relationship management architecture 100 wherein the present invention may be implemented. As shown, the architecture 100 may include a plurality of user computing devices 120a, 120b, . . . 120n, and a CRM 110, coupled to each other via a network 150. The CRM 110 may include a customer relationship management server 111, and a customer relationship management subsystem 112. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the CRM 110 via the network 150, and may be any commercially available computing devices including laptop computers, desktop computers, mobile phones, smart phones, tablet computers, netbooks, and personal digital assistants (PDAs). A client application 121 may run from a user computing device, e.g., 120a, and access the CRM 110 via the network 150. User computing devices 120a-120n are illustrated in more detail in FIG. 3.

The customer relationship management server 111 is typically a remote computer system accessible over a remote or local network, such as the network 150, and may provide access to the customer relationship management subsystem 112. The customer relationship management server 111 could be any commercially available computing devices. A client application (e.g., 121) process may be active on one or more user computing devices 120a-120n. The corresponding server process may be active on the customer relationship management server 111. The client application process and the corresponding server process may communicate with each other over the network 150, thus providing distributed functionality and allowing multiple client applications to take advantage of the information-gathering capabilities of the CRM 110. The customer relationship management server 111 may include a pseudo data field controller 1119 which controls configuration and management of pseudo data fields.

In one implementation, the customer relationship management subsystem 112 contains all contact information that may be available to users. In addition to storage of contact information, the customer relationship management subsystem 112 may also be capable of storing configurations regarding specific preferences, regulatory limitations and requirements, and other fields that will facilitate communications, in general or on a by-recipient basis.

In one implementation, the customer relationship management subsystem 112 is capable of communication with multiple sources through the customer relationship management server 111 or through other channels to maintain a current and accurate collection of information regarding customer accounts. The interface with the multiple sources can be, for example, through an Applications Programming Interface or API, as the API interface will allow compatibility with a flexible array of third-party provider servers. The information being updated may include, but is not limited to, licensing information, area of practice, and location of the various customer accounts. In this manner, the customer relationship management subsystem 112 pulls the approved version of what represents an account, which may be a hospital or physician, which then pulls from multiple networks to ensure that the information regarding an account is up-to-date.

The customer relationship management subsystem 112 may be operated by a third party.

In one implementation, the CRM 110 may be a multi-tenant system where various elements of hardware and software may be shared by one or more customers. For instance, a server may simultaneously process requests from a plurality of customers. In a multi-tenant system, a user is typically associated with a particular customer. In one example, a user could be an employee of one of a number of pharmaceutical companies which are tenants, or customers, of the CRM 110.

In one embodiment, the CRM 110 may run on a cloud computing platform. Users can access content on the cloud independently by using a virtual machine image, or purchasing access to a service maintained by a cloud database provider. The customer relationship management subsystem 112 may be a cloud-based customer database that provides a central access to store and distribute consistent data across customer companies as well as their possible third-party partners and agencies that are used to keep this data updated. This system can provide standard data formats and provide an easy and automated way for customers to have access to coordinated and frequently updated CRM data.

In one embodiment, the CRM 110 may be provided as Software as a Service ("SaaS") to allow users to access it with a thin client.

Figure 2:
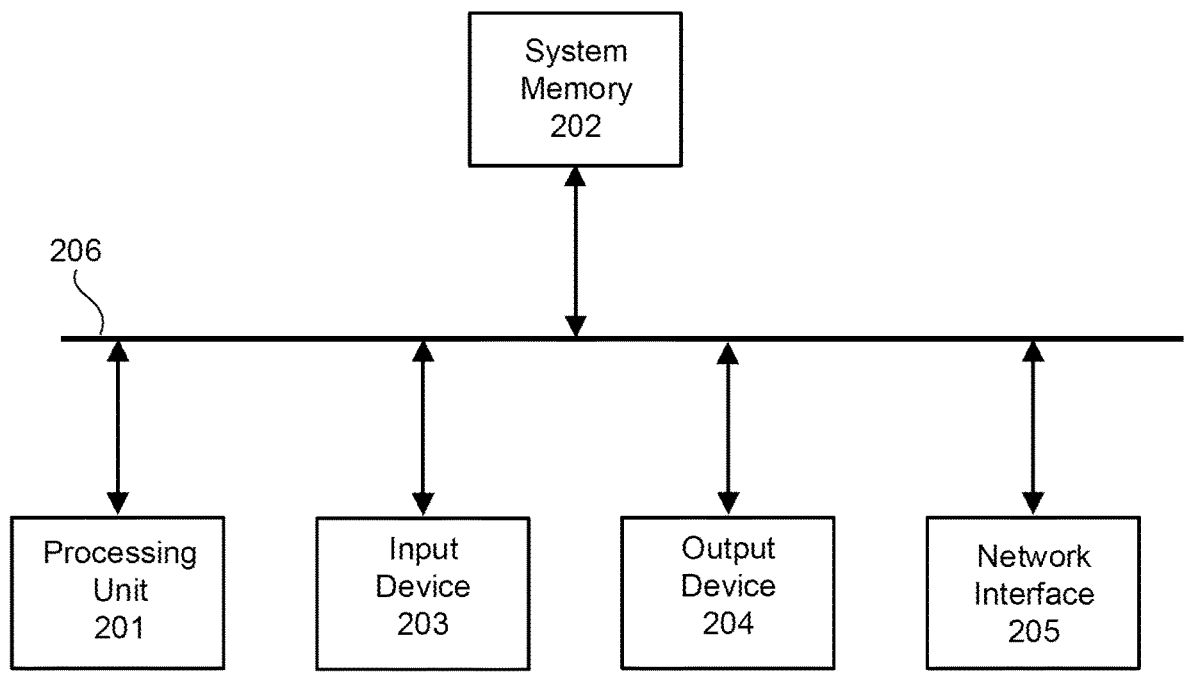
FIG. 2 illustrates an example block diagram of a computing device.

FIG. 2 illustrates an example block diagram of a computing device 200 which can be used as the user computing devices 120a-120n, and the customer management relationship server 111 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 204 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
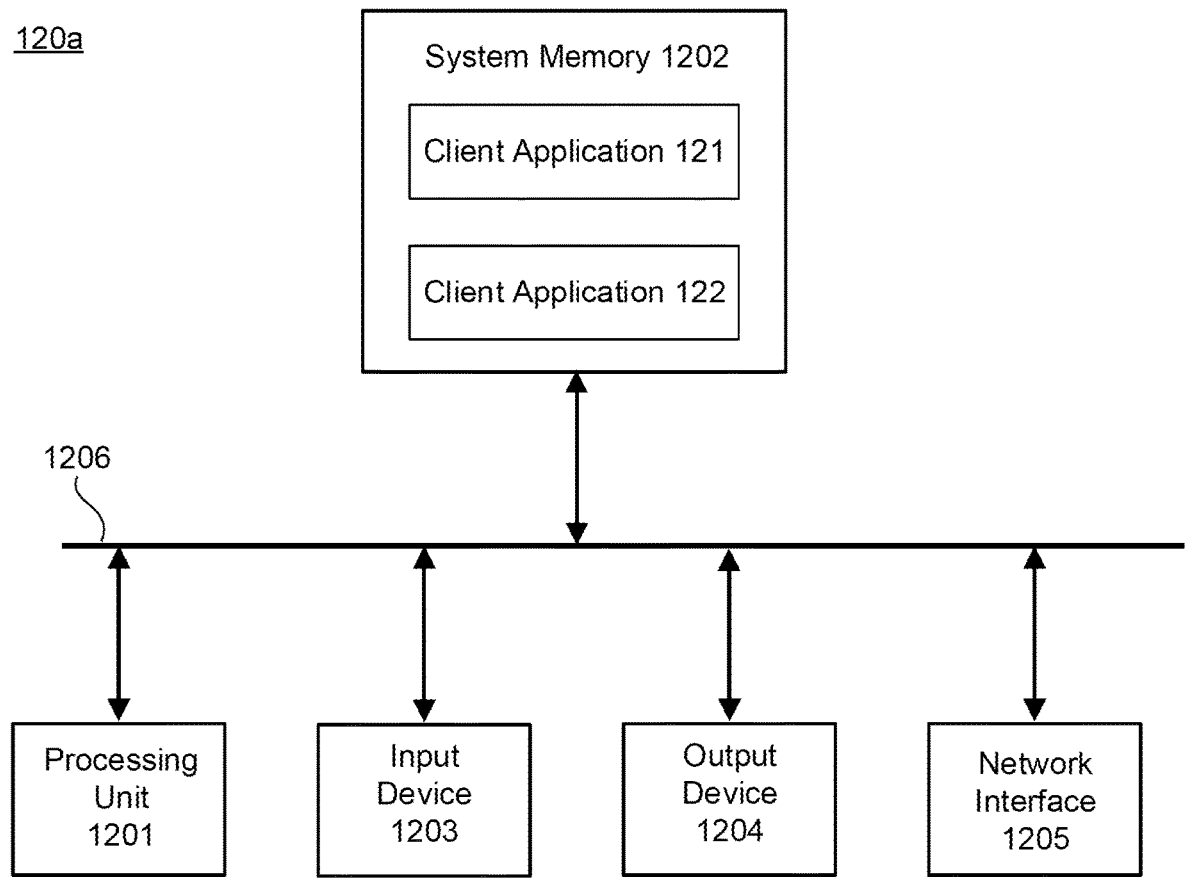
FIG. 3 illustrates an example high level block diagram of a user computing device.

FIG. 3 illustrates an example high level block diagram of a user computing device (e.g., 120a) wherein the present invention may be implemented. The user computing device 120a may be implemented by the computing device 200 described above, and may have a processing unit 1201, a system memory 1202, an input device 1203, an output device 1204, and a network interface 1205, coupled to each other via a system bus 1206. The system memory 1202 may store the client application 121, and the client database 122.

Figure 4:
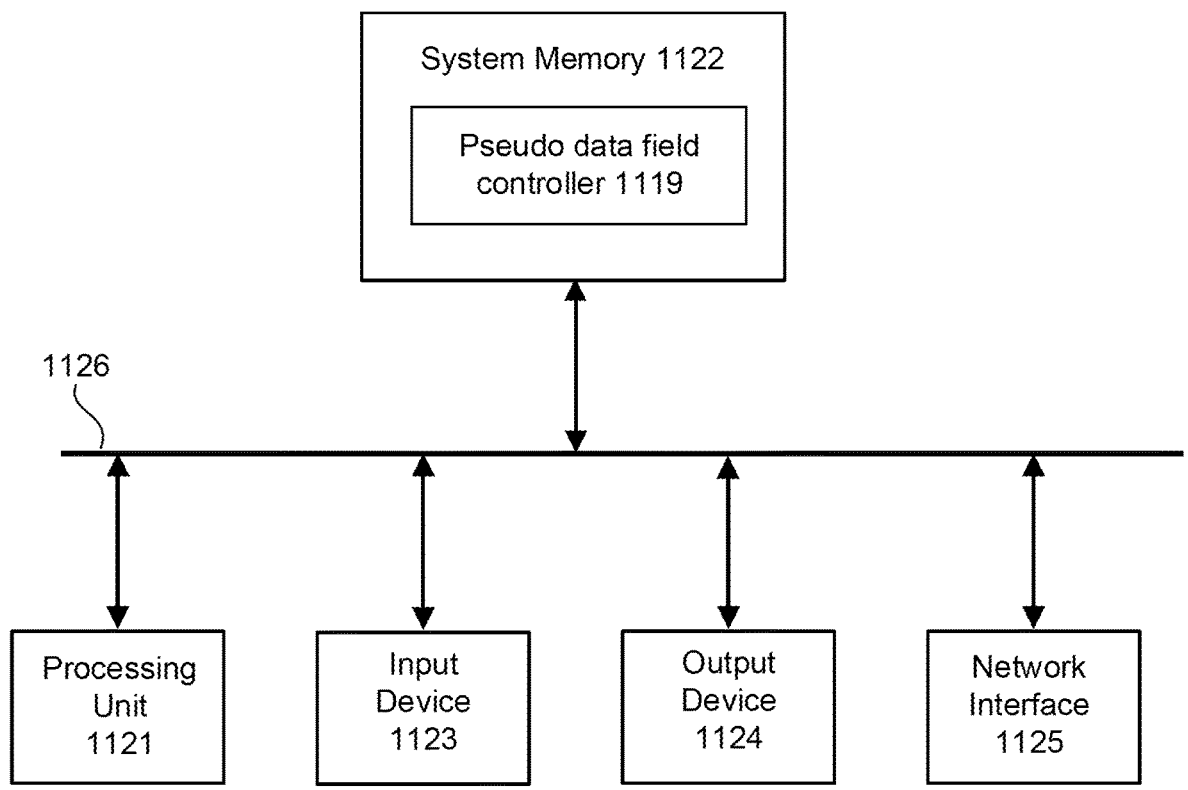
FIG. 4 illustrates an example high level block diagram of the customer relationship management server according to one embodiment of the present invention.

FIG. 4 illustrates an example high level block diagram of the customer relationship management server 111 according to one embodiment of the present invention. The customer relationship management server 111 may be implemented by the computing device 200, and may have a processing unit 1111, a system memory 1112, an input device 1113, an output device 1114, and a network interface 1115, coupled to each other via a system bus 1116. The system memory 1112 may store the pseudo data field controller 1119.

Figure 5:
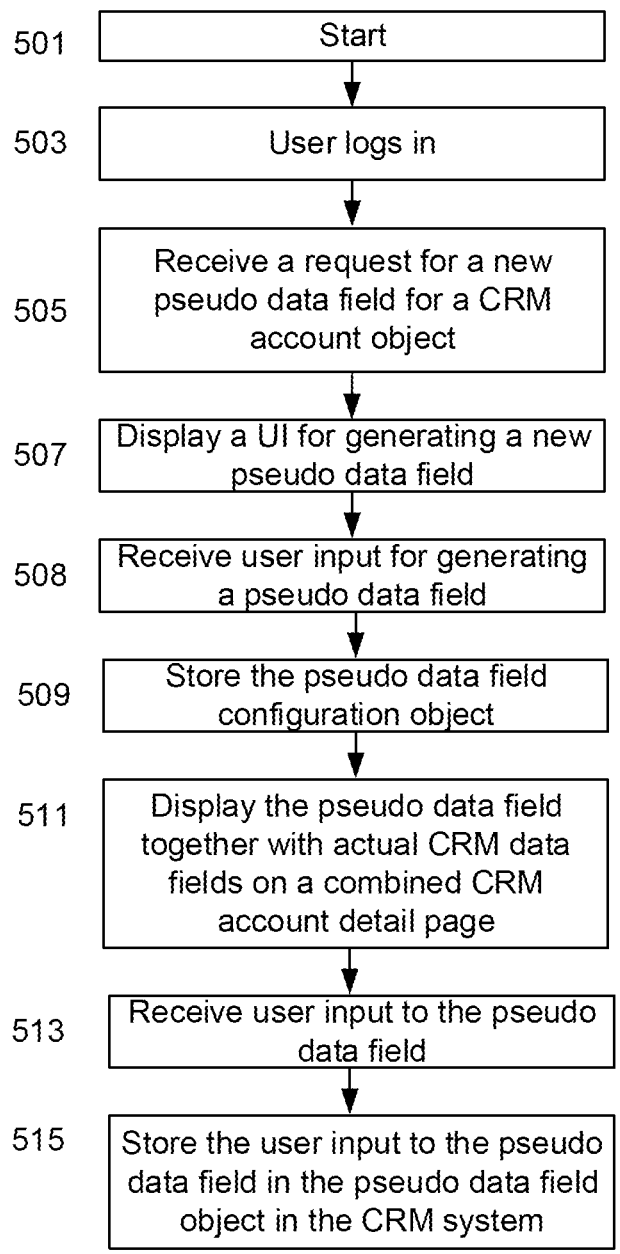
FIG. 5 illustrates an example flowchart of a method for configuring and managing a pseudo data field in the CRM system according to one embodiment of the present invention.

FIG. 5 illustrates an example flowchart of a method for generating and managing a pseudo CRM data field according to one embodiment of the present invention. The process may be controlled by the pseudo data field controller 1119 and start at 501.

At 503, a first end user may log into the CRM system 110 with a user computing device, e.g., 120*a*.

At 505, a request for generating a new pseudo data field for an account object in the CRM system 110 may be received at the CRM server 111.

At 507, a user interface for generating a new pseudo data field for an account object in the CRM system 110 may be displayed. The user interface for generating a new pseudo data field may have a first area for receiving input for the pseudo data field configuration object. The first end user may create records of this object to define the type of field/type of data that should be made available for all end users to capture the needed information. The user interface for generating a pseudo data field may have a second area for receiving input for the pseudo data field object. As end users populate the data made available through the pseudo data field configuration object, the new data is saved to the pseudo data field object.

At 508, user inputs may be received at the first area and the second area on the user interface for generating a new pseudo data field for an account object in the CRM system 110.

In one embodiment, an end user may want to access and activate pseudo data field Objects, Fields, Record Types, Page Layouts, user interface framework (e.g., VisualForce) components, and user interface framework (e.g. Visualforce) tabs. He may create a pseudo data field configuration object with the following components:
1. Record Types; and
2. Fields.

Page Layouts and VisualForce may also be enabled.

He may create the pseudo data object with the following components:
1. Record Types; and
2. Fields.

Page Layouts and VisualForce may also be enabled.

In one embodiment, an end user may want to define pseudo data fields so that other users can view and modify the values for the defined pseudo data field. The end user may have the ability to define new pseudo data fields of the following data types:
1. Text;
2. Text Area;
3. Picklist;
4. Checkbox;
5. Number;
6. Date; and
7. Datetime.

The end user may create pseudo data field object with the following components:
1. Record Types; and
2. Fields.

VisualForce may also be enabled.

A number of record types are provided, each of which may allow end users to create a pseudo data field of this record type. In one embodiment, end users may create pseudo data fields of text, text area, number, date, date time, picklist and checkbox. Among them, text, text area, number, date and date time may have the same fields listed on a page layout for these record types. The Picklist may have a field called "Available Values," that is where the end users may provide the values that should be included in the picklist. The picklist may behave exactly like a custom picklist in Salesforce™ CRM, where the value of None is displayed as the first line item in the field.

Each of the configuration records may have fields that need to be defined, and end users may define, e.g., a section, a name, and a label.

The data in pseudo data fields is not an actual CRM object. To make a pseudo data field to behave like an actual CRM object and be accessible by end users, the user interface may be configured so that the object definition based on the pseudo data field configuration record is read or displayed as an actual CRM data field.

At 509, the pseudo data field configuration object may be stored to the CRM subsystem 112.

At 511, a combined CRM Account Detail page for displaying the pseudo data fields together with other CRM account information may be generated in response to a request for displaying a CRM Account Detail page. In one embodiment, the combined CRM account detail page is a VisualForce page.

In one embodiment, the pseudo data field may be added as a component to a CRM account page layout, so that it can be displayed on a CRM Account Detail page, in a way similar to actual CRM data fields displayed on the CRM Account detail page. In one example, a pseudo data field of Record Type 'Text' and Label 'Cholecap Lunch and Learn Response' may be added to the Professional Account Page Layout. When an end user interacts with an Account type Professional, they would view the 'Cholecap Lunch and Learn Response' pseudo data field on the Detail Page of the Account and have the opportunity to edit, thus creating a pseudo data field record.

At 513, a user input may be received at the pseudo data field on the combined CRM Account Detail Page.

In one embodiment, CRM account fields and pseudo data fields may be edited on the same combined CRM Account Detail page. When users go to the "editing an account" CRM user interface, they see either an account field or a pseudo data field that needs to be populated. They can click on 'edit', the responding behaviors of the account field and the pseudo data field are the same to the end user. In one embodiment, a user interface may be created to display an edit page for pseudo data fields as well as the fields, and logics may be added to control what is saved first, since pseudo data fields are inherently not CRM data fields but data that is being saved. In one embodiment, the user interface is a VisualForce page. In one embodiment, the logic is to save account fields first, and pseudo data fields are saved after the account fields are saved. If the pseudo data fields do get saved, they are saved individually and differently from actual CRM objects to record. In one embodiment, actual CRM account fields save on an 'all or none' basis. If one CRM account field is populated incorrectly (e.g., date field that has been populated with text), then none of the fields can be saved and the user remains on the edit page. However, a pseudo data field can be saved while the data attribute in another pseudo data field on the same edit page fails. In one example, any pseudo data field that gets populated correctly will be saved and a record is created, and anything that fails will cause display of an error message. End users will remain on the same edit page until they correct all mistakes and save correctly. If an actual CRM account field fails to save, then no pseudo data field gets saved either.

In one embodiment, the pseudo data fields on the combined CRM Account Detail page may appear in a separate section on the page layout, but other than this, the end-user experience is identical. When a user enters a value for a pseudo data field from the combined CRM Account detail page, the value (along with other data points like Attribute Label and Account associated with the value) will be stored in the pseudo data field object.

One end user may create configuration records to make pseudo data fields available to other end users, and end users may populate fields in configuration object, including the name, label, product details, and status. In one embodiment, there are three statuses for configuration record: active, inactive, staged. If it is active, it is displayed to the end user. If it is inactive or staged, it will not. When an end user added a pseudo data field, made it available to end users, gathered the data he needs from end users, and does not need the pseudo data field anymore, he/she can put the pseudo data field in the inactive status, so that the pseudo data field may disappear from all end users' devices. If the end user wants to make the pseudo data field inactive for a short period of time, e.g., to make changes to the pseudo data field, he may put it in staged status so that he can modify it, but other end users can't access or edit it. When a pseudo data field is in the staged status, the end user who created it can track it, update it, make it available again, or put it in inactive status.

In one embodiment, the end user creating the pseudo data field may set the pseudo data field as read-only for other end users.

At 515, a user input to the pseudo data fields may be stored to the pseudo data field objects in the CRM subsystem 112.

Since pseudo data fields are not actual CRM data fields and can't be stored as account data in the CRM system, the second object, pseudo data field object, may be used to store the data. For each pseudo data field record, the pseudo data field controller 1119 may track which pseudo data field it is populated for, the date it was populated, whether it is active or inactive, the name of the pseudo data field, the label, etc. The system may also stamp the value of the pseudo data field. Each type of pseudo data field may be saved within this object, for example, if the pseudo data field that was created is a text record type, when the end user populates that text, the value may get saved in the text field within the pseudo data field object (e.g., for the text field "hair color," the value is Red). The pseudo data field object may store data for all different data types or record types, including a text area field, checkbox, number, data, date, and picklist.

End users may create an audit trail for the pseudo data field. End users may select "Track Changes" by checking a checkbox. If "Track Changes" is unchecked, every time the end user populates a pseudo data field record, the pseudo data field record is updated. However, if "Track Changes" is checked, every time that the pseudo data field is updated by an end user, it may inactivate the last record, create a new record, and activate the new record, so the end users can always see the latest updated record on their device, while the old record is still stored in the CRM subsystem 112. In one example, "Track Changes" is on, an end user chooses hair color as Blonde. When that is saved, a pseudo data field record is created with Blonde as the value of that picklist, and the last modified date as Sep. 1, 2019. One week later, the end user may change the color to Red and save. The pseudo data field controller 1119 may automatically create a second pseudo data field record where the hair color is equal to "red", and the last modified date is Sep. 8, 2019. The second pseudo data field record is the one that is displayed to all end users until the hair color is updated again, while the first pseudo data field record is still saved in the CRM subsystem 112. The last active field/record is always displayed to the end users if Track Changes is on. If "Track Changes" is off, the Blonde record that has existed before is updated to red, it remains active, and the last modified date is updated to Sep. 8, 2019, but no new pseudo data field record is created.

In one embodiment, if two users populated the same pseudo data field at the same time and save, the latest record that goes up as active is the one that will be displayed to other end users.

To end users, the pseudo data fields look and feel exactly like an actual CRM data field, and end users won't see or feel any differences. They can populate pseudo data fields made available to them and update data there.

In one embodiment, the present invention allows users to configure what to display on a custom report and how to arrange and display the content (e.g., size, color, theme) on the custom report, so that they can visualize the CRM data the way they want. A data visualization interface may be used to generate the custom report, and may have code in a markup language for describing and defining the content of the custom report. One example of the markup language is HyperText Markup Language ("HTML"), and the HTML code may specify the CRM data to be displayed and their location on the custom report according to user configuration. The data visualization interface may also have code in a programing language for describing the custom report's functionality, which may be, e.g., JavaScript code for specifying the objects and fields users want to query to obtain the CRM data to fill up the custom report. The CRM data is returned to the data visualization interface in JSON format. The JavaScript code may place the CRM data at the right place on the custom report, using the HTML to display the custom report.

Users may modify the objects and fields they like to query using the JavaScript. The data visualization interface could be a webpage, iFrame, or Webview.

The present invention provides an application programing interface ("API") which may communicate with the JavaScript in the data visualization interface and then query data and objects in the CRM subsystem 132 to get a result set.

In one implementation, the API may be a unified API which may query various types of data sources across multiple platforms, e.g., iOS, Windows, and the browser for Salesforce online. What a user frequently queries (e.g., the last five calls, most recent calls or all calls submitted) may be packaged up in well formed API calls. The JavaScript may communicate with the API only, and does not have to care about the type of the actual database to be queried.

Figure 6:
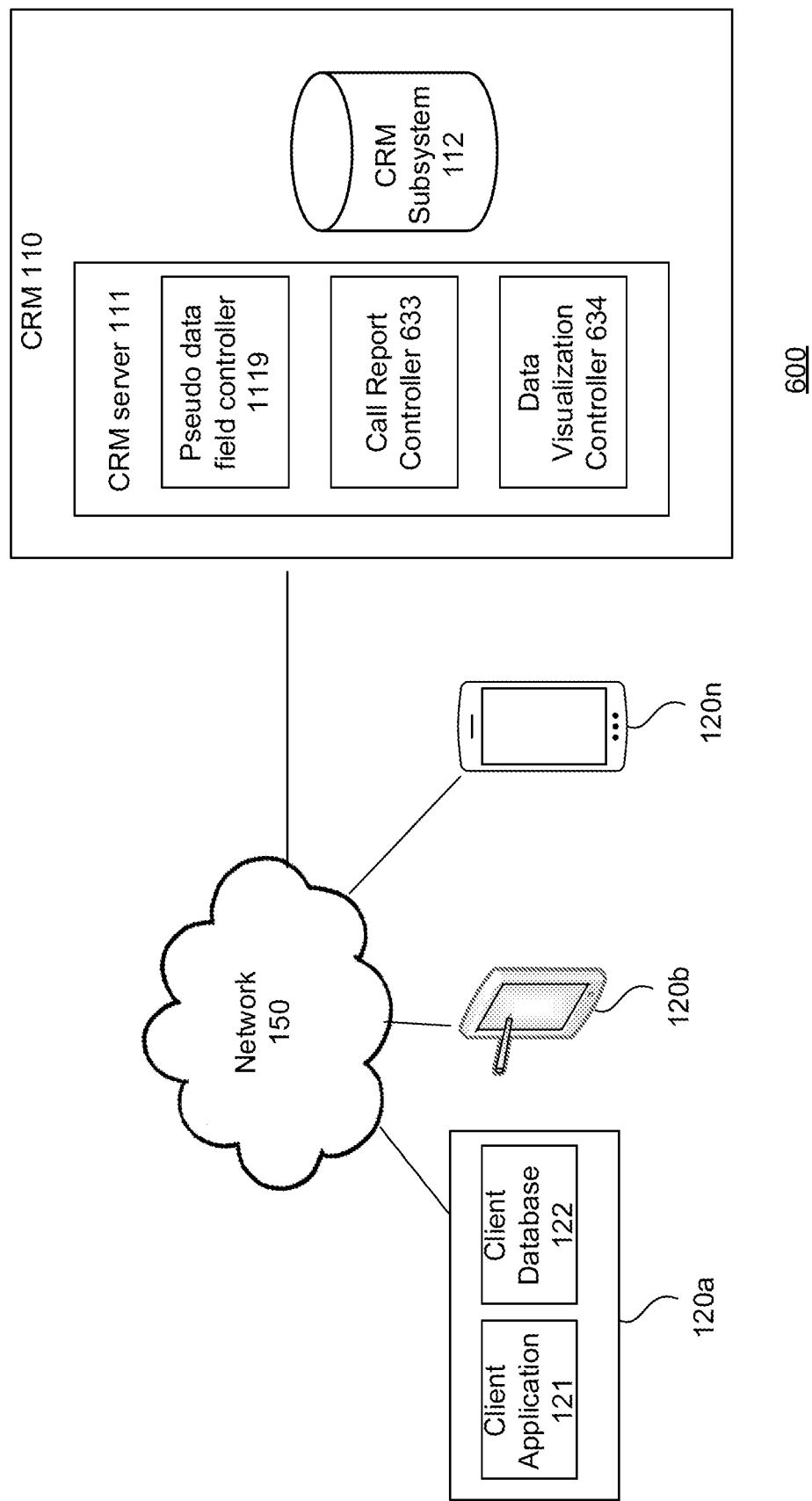
FIG. 6 illustrates an example high level block diagram of a customer relationship management architecture wherein the present invention may be implemented.

FIG. 6 illustrates an example high level block diagram of a customer relationship management architecture 600 wherein the present invention may be implemented. As shown, the architecture 600 may include a plurality of user computing devices 120a, 120b, . . . 120n, and a CRM 130, coupled to each other via a network 150. The CRM 130 may include a customer relationship management server 131, and a customer relationship management subsystem 132. The customer relationship management server 131 may further include a call report controller 633 and a data visualization controller 634. Although the call report controller 633 and the data visualization controller 634 are shown in one server, it should be understood that they may be implemented in multiple servers. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

Figure 7:
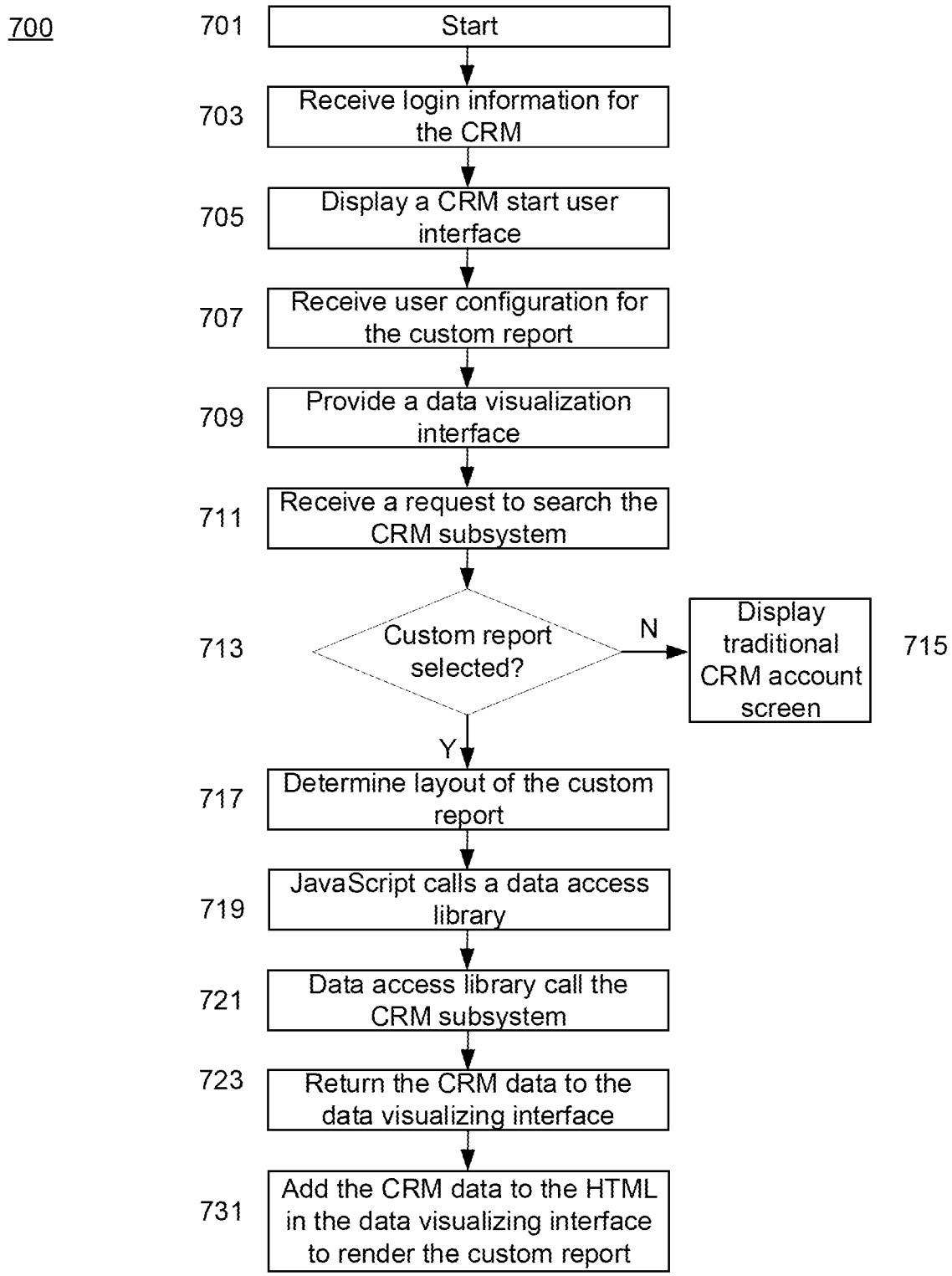
FIG. 7 illustrates an example flowchart of a method for displaying data from a data storage system according to one embodiment of the present invention.

FIG. 7 illustrates an example flowchart of a method for visualizing data from a CRM system according to one embodiment of the present invention. The process may start at 701.

At 703, a user may login to the CRM 130.

At 705, a start user interface for the CRM 130 may be displayed in response, by the CRM server 131.

Figure 10:
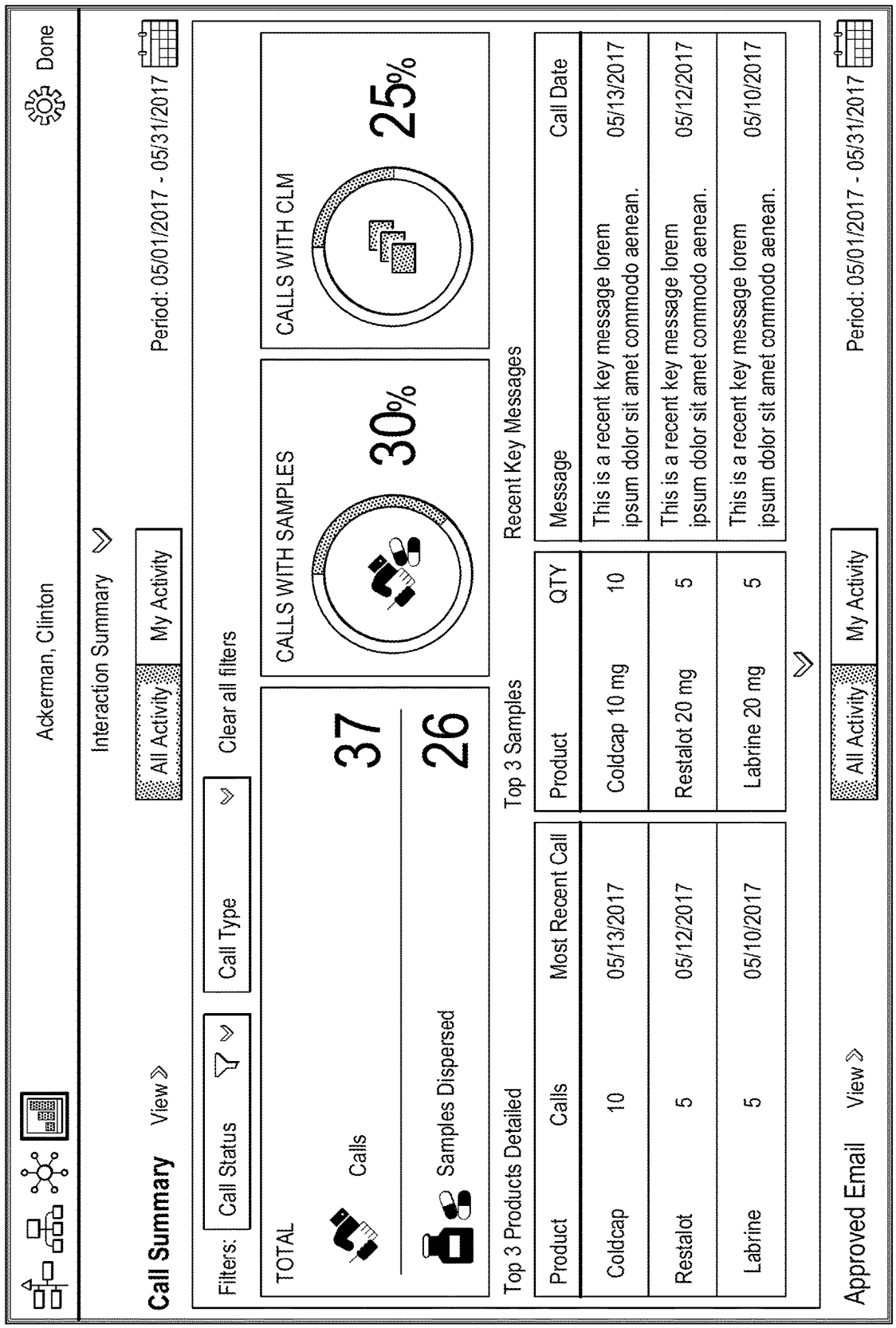
Figure 11:
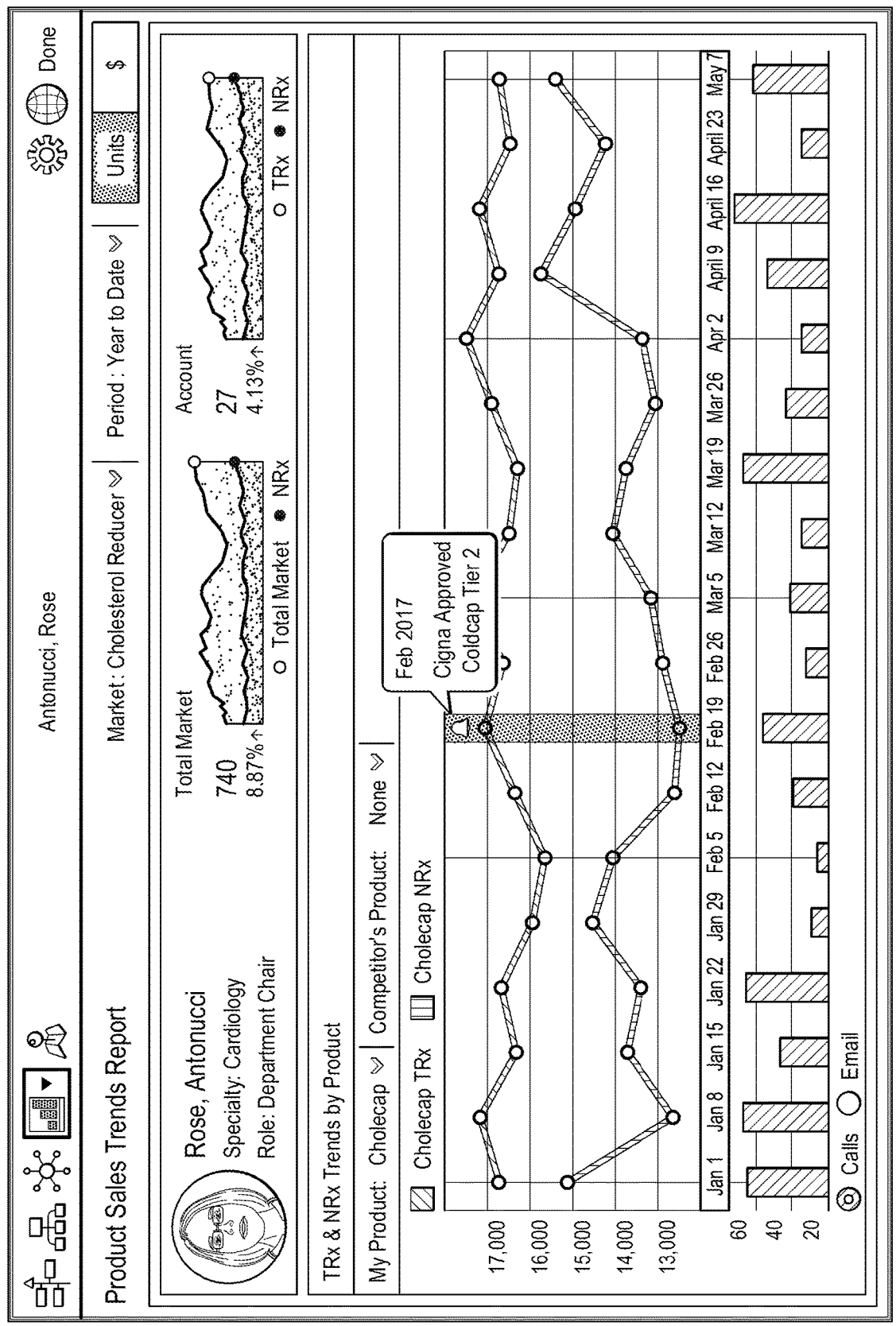
Figure 12:
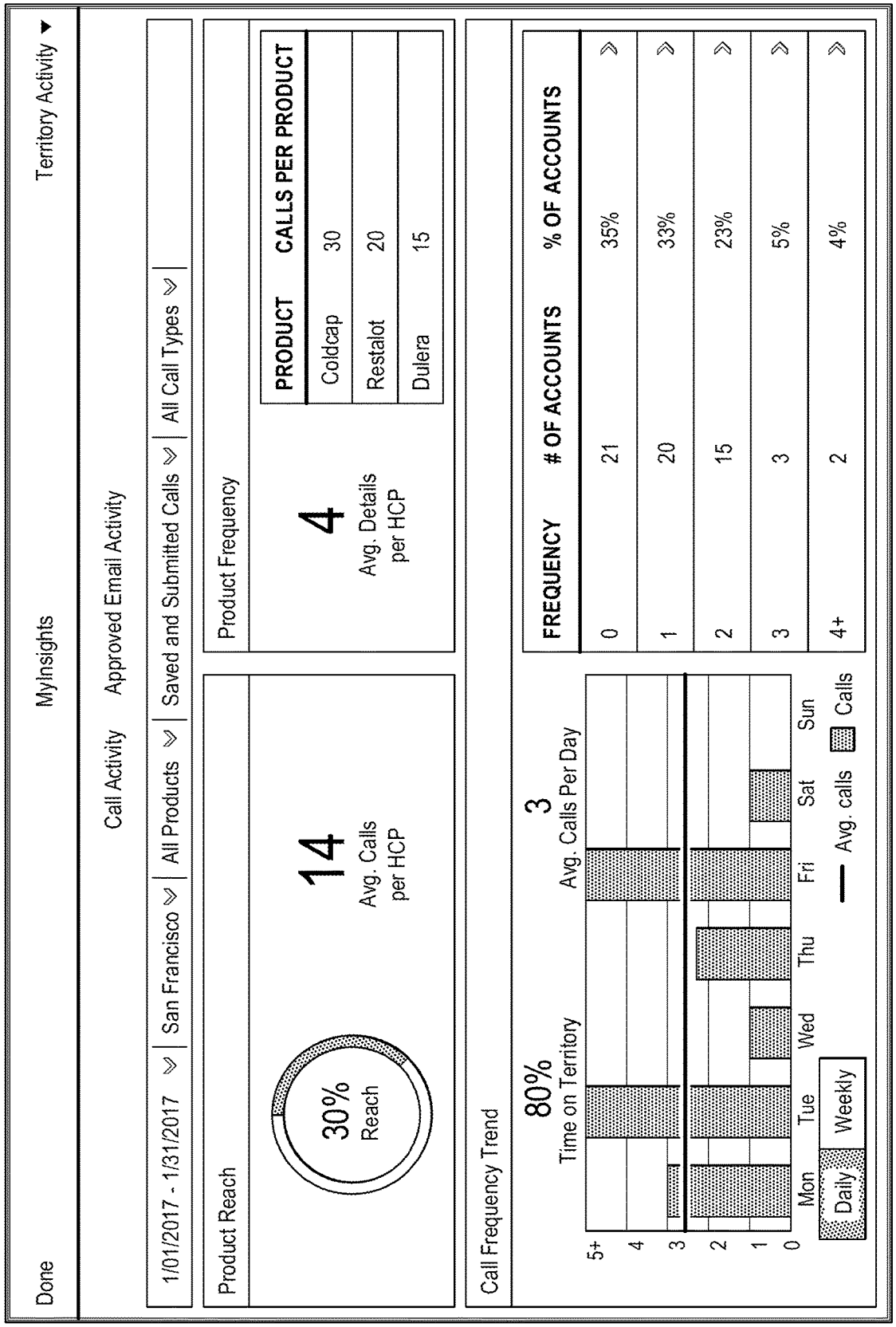
Figure 13:
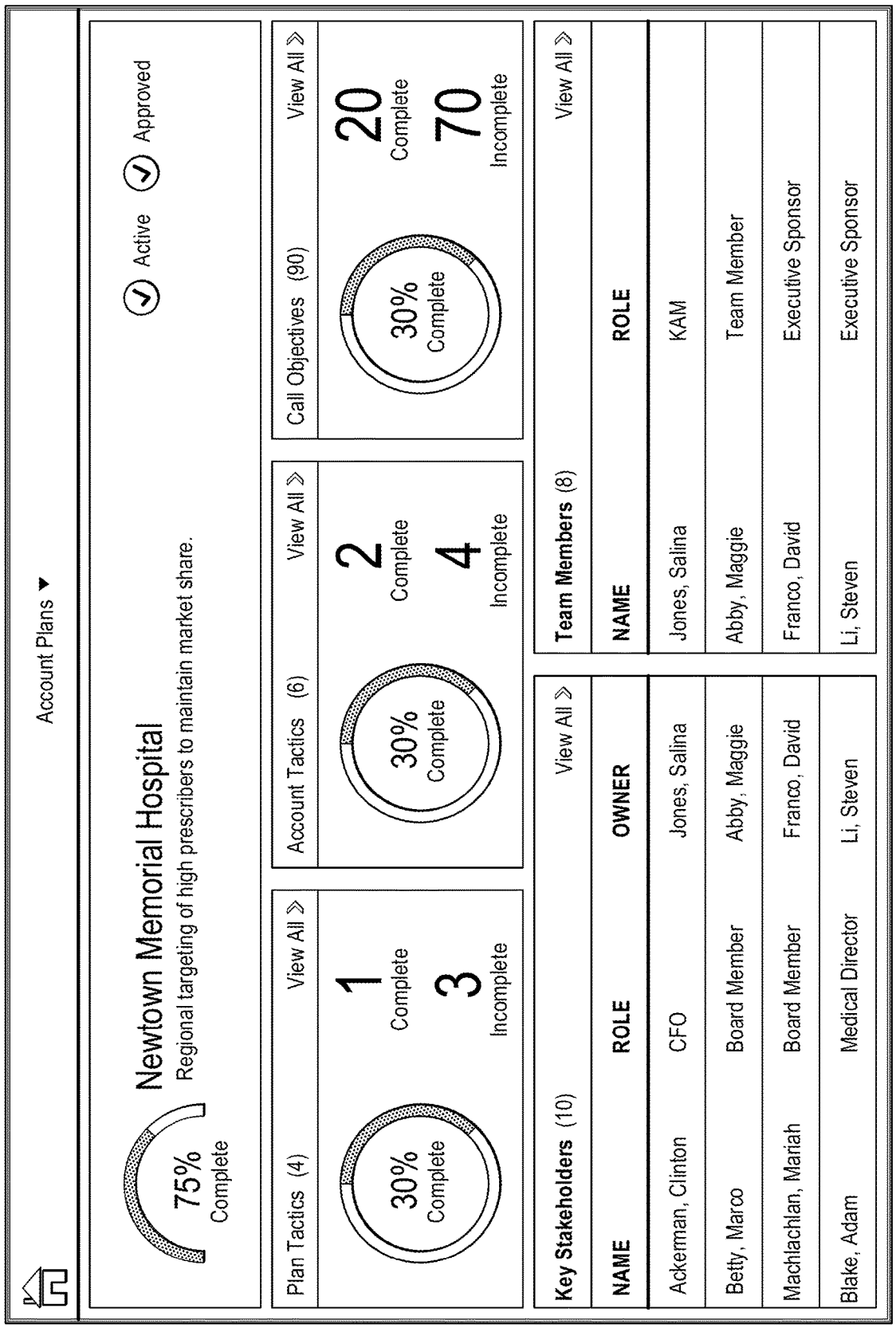
Figure 15:
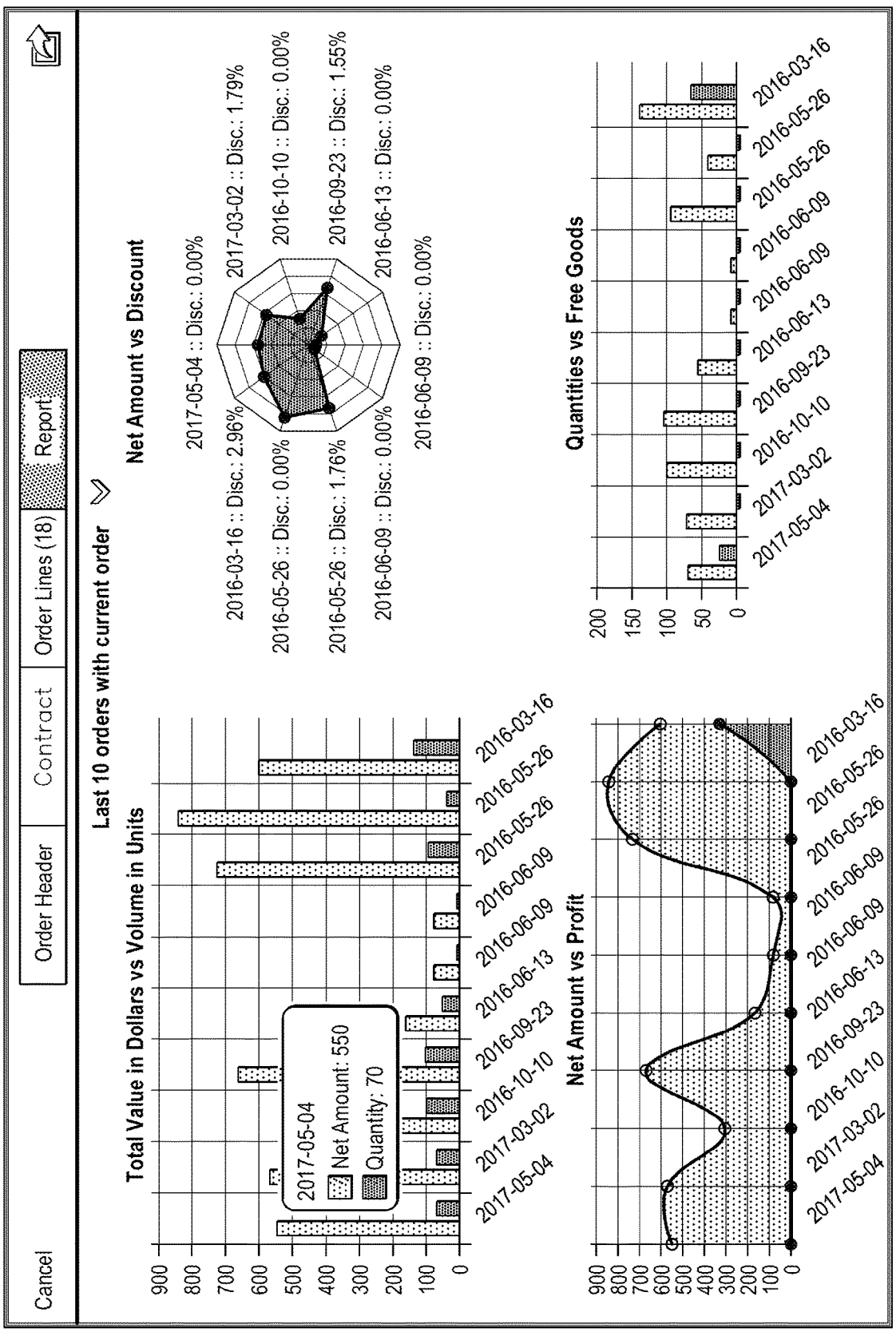

At 707, the user may configure the layout of a custom report. In one implementation, a number of layouts may be displayed by the data visualization controller 634 so that the user can select. Each of the layouts may include a selected set of data fields (e.g., a doctor's name, contact information, and license information), display the data in various formats (e.g., a pie chart, bar chart, donut chart, histogram, line chart, or scatter plot), and arrange the data in various patterns on the user interface. FIGS. 10 to 15 illustrate examples of the custom reports. Specifically, FIG. 10 illustrates an example of a user's call summary, which shows information about calls and samples. FIG. 11 illustrates an example of a product sales trend report, which shows a doctor's name, picture, specialty and product sales trend. FIG. 12 illustrates an example of a user's activity report, including call activities and email activities. FIG. 13 illustrates an example of an account plan, which shows a user's plan tactics, account tactics, and call objectives. FIG. 14 illustrates an example of a KOL profile. FIG. 15 illustrates an example of an order report.

At 709, a data visualization interface may be provided to generate the custom report according to the user configuration of the custom report layout. The data visualization interface may have HTML for specifying the CRM data to be displayed on the custom report and their location on the custom report according to the user configuration.

The data visualization interface may also have embedded JavaScript for specifying the objects and fields users want to query to obtain the CRM data from the customer management relationship subsystem 132 to fill up the custom report.

In one implementation, a number of templates of the data visualization interface may be provided as out of the box options, and the user may customize the templates by editing the HTML.

In one implementation, instead of selecting an out of the box template, the user may build a template himself/herself. The user may take a blank HTML file and write their own HTML. The user may also select methods from a data access library, e.g., the data access library 803 described below, to build their own template of the data visualization interface.

In one implementation, a user interface may be displayed by the data visualization controller 634 for the user to customize the custom report. A number of windows may be displayed for the user to select the type of data to be displayed on the custom report, and the location, format and pattern that the data will be displayed.

In one implementation, the data visualization interface may be a webpage. In one implementation, the data visualization interface may be an iFrame. In one implementation, the data visualization interface may be a Webview.

At 711, the user may search the CRM subsystem 132 for data related to a doctor, e.g., Dr. John Smith. The search result may be returned, e.g., by the CRM server 131.

At 713, it may be determined if the user has selected the custom report, e.g., by the data visualization controller 634. In one implementation, the user may set the custom report as the default view.

If not, at 715, a traditional CRM account screen 1600 with a number of data fields, as shown in FIG. 16, may be displayed by the CRM server 131.

If the user has selected the custom report, at 717, the layout of the custom report may be determined for the user. If the user has not selected a custom report layout, a default layout may be used. The custom report may be used to visualize part or all data on the account record in the style the user selected or the default layout configured. It may also visualize data on related objects. Instead of a list of records, the custom report may have areas to display account details, a photo of the doctor, chart of basic activities (e.g., if they call or email, and the last week of sales). When these areas are filled, the custom report may help the user to understand who the doctor is and his/her activities, as shown in FIGS. 10 to 15. Rather than a data entry heavy CRM account screen, the custom report may be an account level report, or a sales dashboard.

In one implementation, the JavaScript embedded in the data visualization interface may query the CRM subsystem 132 through an application programing interface ("API").

In one implementation, the user may select methods to use from the data access library to interact with the API.

When there is a child application, one application that lives within another installed application, the child application usually communicates through the API provided by the parent application to a data source inside the parent application or external to and exposed through the parent application. Should this child application live within multiple parent applications that provide potentially distinct APIs, the child application would contain multiple pathways through the logic in the application to accommodate these differences in the parent application APIs.

The data visualization of the present invention may facilitate the creation of custom content for data from various platforms, e.g., iOS, Windows, and the browser for Salesforce online. The data visualization controller 634 of the present invention may be integrated as a portion of iOS, Windows Mobile, or Salesforce web applications, and live as a child application within these parent applications. In order to make convenient use of the CRM data, whether it is available through network calls or locally within the parent application, the data access library may expose an API for interacting with the CRM data.

In one implementation, the CRM subsystem 132 may use the Salesforce™ CRM. The two distinct data sources, local SFDC and the Salesforce online application data sources, require two different implementations to accomplish the same end effect—a unified API used to communicate with different parent applications. The "online" implementation is the implementation that lives within the Salesforce online web application. The "offline" implementation is the implementation that lives within a native app such as an iOS application or a Windows Mobile application.

Figure 8:
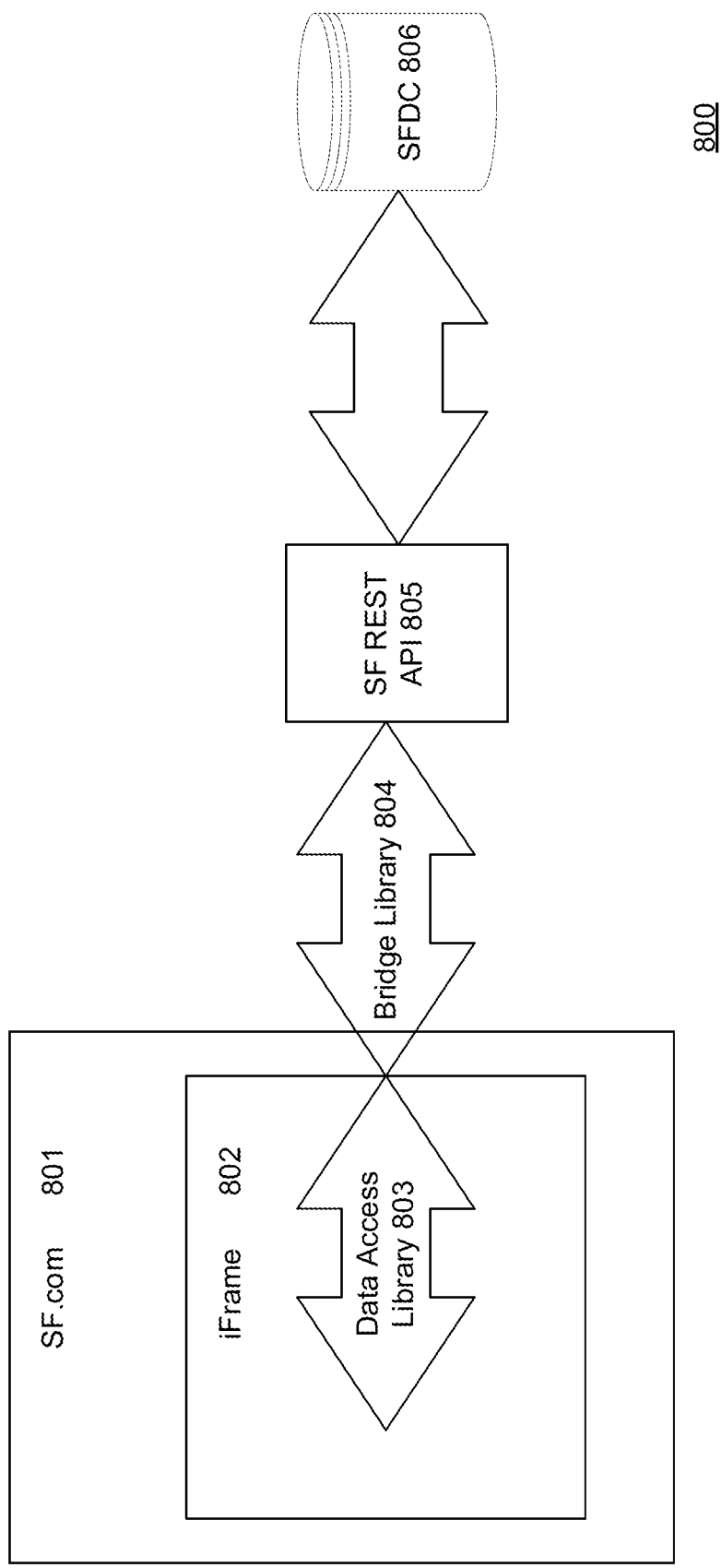
FIG. 8 illustrates an example application programming interface ("API") according to one embodiment of the present invention.

For the online implementation, as shown in FIG. 8, the communication pathway from the data visualization interface code (e.g., the JavaScript code in the data visualizing interface) to the SFDC 806 may incorporate three libraries. The JavaScript code may first make calls to the data access library 803 at 719. These calls are the exact same calls they would make when the report is running inside of a CRM native iOS or Windows application.

After the JavaScript code makes a call to the data access library 803, at 721, the data access library 803 may query objects and fields in the CRM subsystem 132, starting with posting a message from within the iFrame where the report is rendered, to the parent page via the window.postMessage( ) function provided by the web browser vendor. The Bridge Library 804 instantiated within the customized Salesforce page is subscribed to and listening for these messages. When the Bridge Library 804 receives a message from the data access library 803, the corresponding and appropriate functions are called within the Salesforce Force library, which is incorporated in the Bridge Library files, to return the data requested by the JavaScript code through queries to the Salesforce REST API 805. The Bridge Library 804 normalizes the data returned from the Salesforce API 805 in order to give it the same shape as the data that would be returned in the Offline Implementation. At 723, the data requested by the Javascript code may be returned to the data visualization interface from the CRM subsystem 132.

Figure 9:
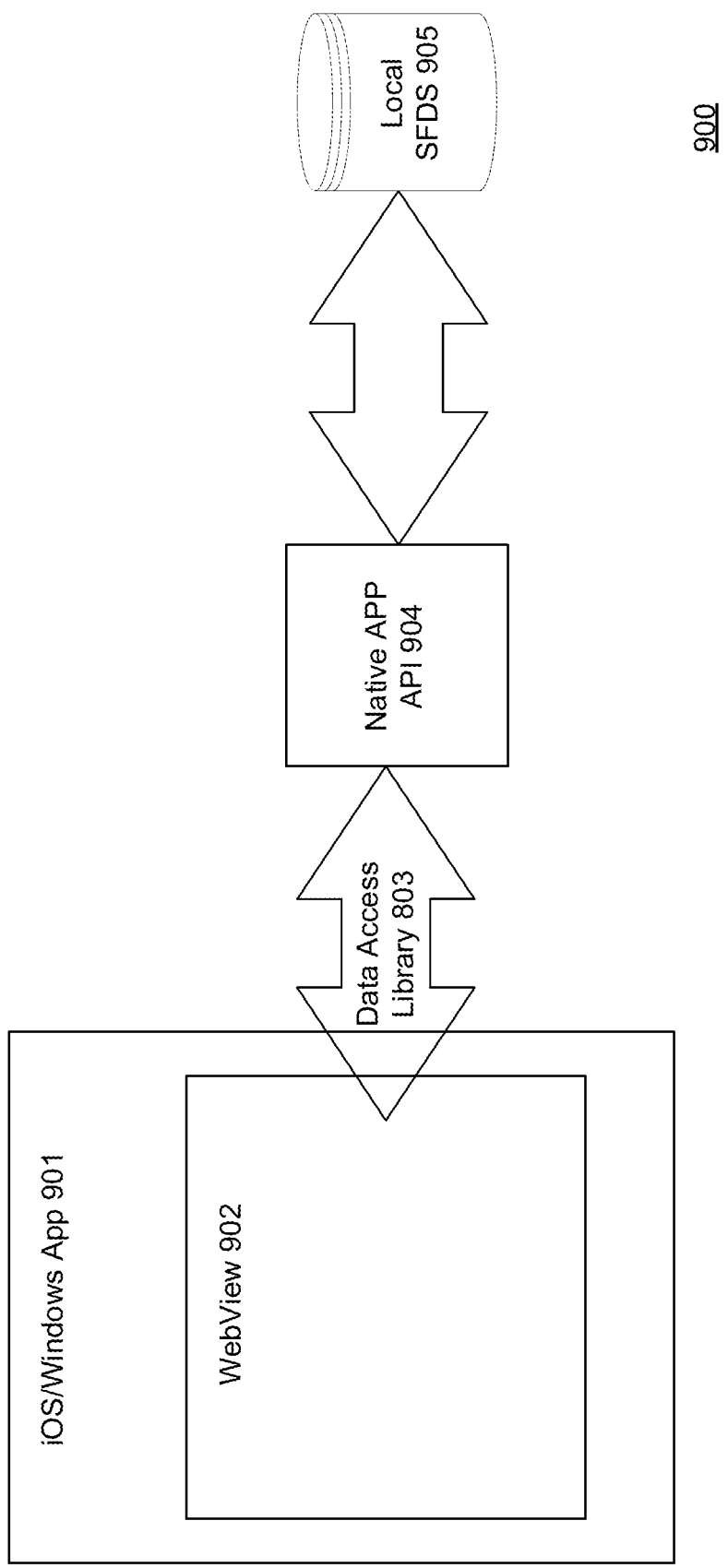
FIG. 9 illustrates an example API according to one embodiment of the present invention.

For the offline implementation, as shown in FIG. 9, the custom report within the native application, is rendered within a Webview 902. This is a web browser within the native application. In order for the report within the Webview to communicate with the parent application, a unique use of the url/location of the Webview 902 has been devised where strings with a certain signature posted to the location of the Webview 902 are captured while the navigation of the Webview 902 is cancelled. That string contains commands and queries that can run against the local data source. This cycle of posting strings to the location of the Webview 902 and the native application posting the data back to the Webview 902 are completed by using unique callbacks for each query. This cycle of queries and callbacks is facilitated by the data access library 803. Calls and returns are normalized to be the same as the calls and returns in the Online implementation.

The data access library 803 is a unified API which may be used to communicate with a parent application, whether the device is in an offline state (disconnected from the internet) or online state (connected to the internet), from within the parent application—the parent application being an application installed on a device or an application running within a web browser.

In one implementation, the CRM data may be returned to the data visualization interface in JSON format.

At 731, the JavaScript code may place the CRM data at the right place on the custom report, using the HTML to render the custom report.

The present application is a continuation-in-part of U.S. nonprovisional patent application Ser. No. 16/724,086, filed on Dec. 20, 2019, entitled System and Method for Generating and Managing Pseudo Data Fields in CRM; and a continuation-in-part of U.S. nonprovisional patent application Ser. No. 15/672,287, filed on Aug. 8, 2017, entitled System and Method for Displaying Data from a Storage, which are hereby incorporated by reference herein for all purposes.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for generating a pseudo data field in a CRM system, the method comprising:
   receiving a request, at a pseudo data field controller in a server of the CRM system, for generating a pseudo data field for an account object in the CRM system;
   displaying a first user interface for generating the pseudo data field, wherein the first user interface comprises a first area for receiving input for configuring a pseudo data field configuration object;
   receiving a first user input, in the first area on the first user interface, for a pseudo data field configuration object;
   storing the pseudo data field configuration object in a storage device of the CRM system;
   generating and displaying a combined CRM account detail page, wherein the combined CRM account detail page comprises a first area for displaying fields of the account object in the CRM system and a second area for displaying the pseudo data field;
   receiving a second user input in the pseudo data field on the combined CRM account detail page;
   storing the second user input in a pseudo data field object in the storage device of the CRM system, separately from data in the fields of the account object in the CRM system; and
   enabling generation of a data visualization interface for rendering a first custom report according to user configuration previously received on a template of the data visualization interface, wherein the user configuration comprises a first type of data to be displayed at a first location on the first custom report and a second type of data to be displayed at a second location on the first custom report.

2. The method of claim 1, further comprising: generating a first record of the pseudo data field configuration object for defining a data type to be entered in the pseudo data field.

3. The method of claim 2, wherein the data type comprises text.

4. The method of claim 2, wherein the data type comprises a text area.

5. The method of claim 2, wherein the data type comprises a picklist.

6. The method of claim 2, wherein the pseudo data field configuration object comprises a record type and a field.

7. The method of claim 1, wherein the pseudo data field object comprises a record type and a field.

8. The method of claim 1, wherein the first user interface for generating the pseudo data field comprises a second area for receiving input for configuring the pseudo data field object.

9. The method of claim 1, further comprising: adding the pseudo data field as a component to a page layout of the account object in the CRM system.

10. The method of claim 1, further comprising: storing input to fields of the account object in the CRM system on the combined CRM account detail page before storing input to the pseudo data field on the combined CRM account detail page.

11. The method of claim 1, further comprising: changing the pseudo data field to an inactive status to remove it from the combined CRM account detail page.

12. The method of claim 1, further comprising: changing the pseudo data field to a staged status to temporarily prevent access to it.

13. The method of claim 1, further comprising: changing the pseudo data field to a read-only status.

14. The method of claim 1, further comprising: tracking data changes to the pseudo data field.

15. A CRM system, comprising:
   a storage device;
   a CRM server, wherein the CRM server comprises a pseudo data field controller for:
      receiving a request, at a pseudo data field controller in the server of the CRM system, for generating a pseudo data field for an account object in the CRM system;
      displaying a first user interface for generating the pseudo data field, wherein the first user interface comprises a first area for receiving input for configuring a pseudo data field configuration object;
      receiving a first user input, in the first area on the first user interface, for a pseudo data field configuration object;
      storing the pseudo data field configuration object to the storage device of the CRM system;
      generating and displaying a combined CRM account detail page, wherein the combined CRM account detail page comprises a first area for displaying fields of the account object in the CRM system and a second area for displaying the pseudo data field;
      receiving a second user input in the pseudo data field on the combined CRM account detail page;
      storing the second user input in a pseudo data field object in the storage device of the CRM system, separately from data in the fields of the account object in the CRM system; and
      enabling generation of a data visualization interface for rendering a first custom report according to user configuration previously received on a template of the data visualization interface, wherein the user configuration comprises a first type of data to be displayed at a first location on the first custom report and a second type of data to be displayed at a second location on the first custom report.

* * * * *